3,115,449
HEAT TRANSFER DEVICE
Peter Fortescue, La Jolla, and David Nicoll, Del Mar, Calif., assignors, by mesne assignments, to the United States of America as represented by the United States Atomic Energy Commission
Filed Oct. 6, 1958, Ser. No. 765,545
2 Claims. (Cl. 204—193.2)

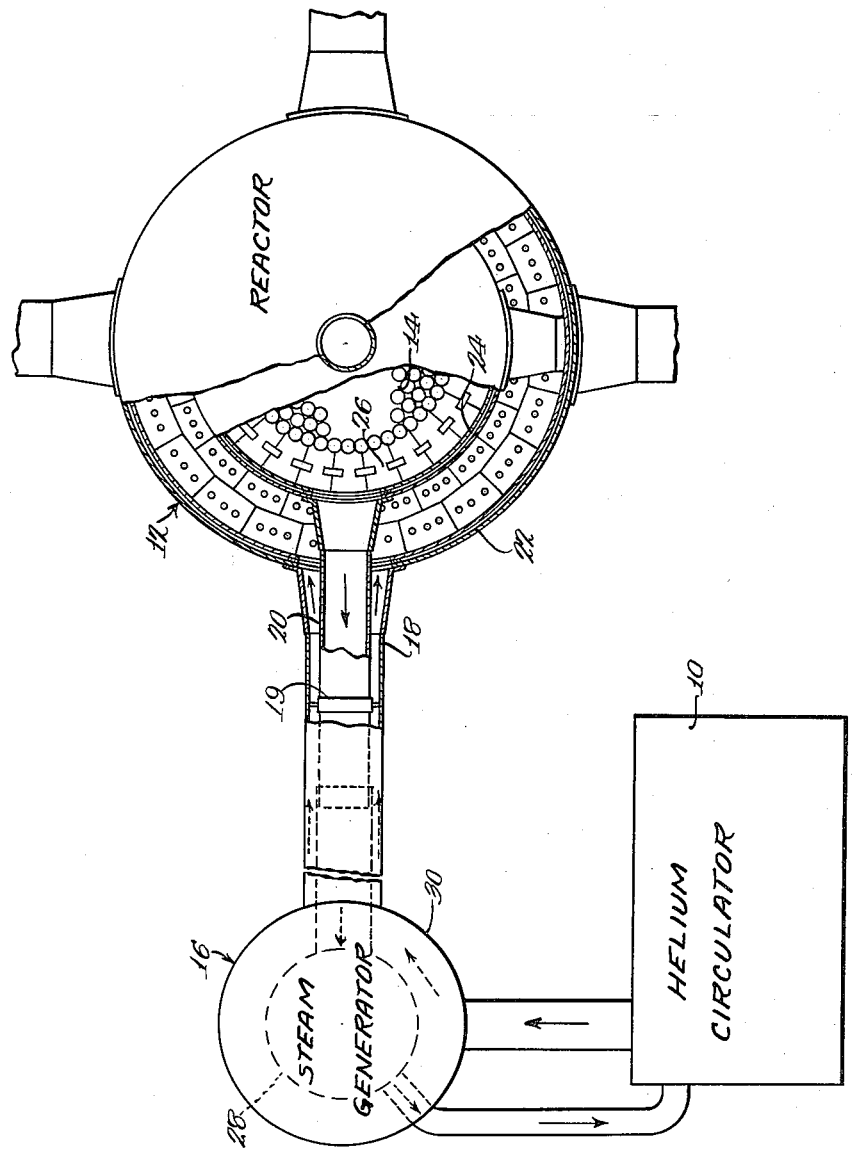

This invention relates generally to a heat transfer device and is more particularly concerned with the exchange of gases in a gas cooled neutronic power reactor.

In a gas cooled neutronic power reactor a pressurized gas, such as helium or the like, is introduced into the reactor vessel to serve as a coolant for the neutronic field. This coolant also enters the neutronic field proper where it is heated to a considerable extent through the neutronic reaction being carried on within the field, and the heated gas then passes to a steam generator or the like wherein the heated gases are utilized in the production of power. The transfer of these heated gases from the reactor vessel to the power converting means has given rise to a number of problems, particularly in connection with the provision of suitable duct work for transferring the hot gases from the reactor vessel to the steam generator and in providing suitable sealing means at the juncture of the hot gas duct with the reactor vessel. Due to the high temperatures and pressures existent within the outlet duct from the reactor vessel, it has heretofore been considered necessary to provide a quite expensive heavy metal duct for such outlet and, furthermore, the sealing of the outlet duct at its connection with the reactor vessel has necessitated the use of rather elaborate and expensive sealing arrangements.

It is a primary object of this invention to provide a novel heat transfer means for the interchange of gases with a vessel, which is considerably simplified in structure and improved in efficiency, particularly with respect to the sealing of the heat transfer ducts at their juncture with the vessel. Another object of the invention is to provide an improved heat transfer means for a neutronic power reactor, comprising a concentric duct arrangement wherein the outer duct conveys the cooling gas to the reactor vessel and the inner duct conveys the heated gas away from the reactor vessel.

Other objects and advantages will be apparent from the following description of the selected embodiment of the invention, which is shown schematically in the accompanying drawing.

Although it will be apparent that the heat transfer means disclosed herein may be used to advantage elsewhere, it is particularly adaptable to a gas cooled neutronic power reactor and, therefore, will be described with respect to such apparatus. In a gas cooled reactor, such as the one illustrated in the drawing, there is provided a cooling system for the reactor vessel wherein a gas coolant is directed under pressure from a gas circulator 10 into and through the reactor vessel 12. The gas absorbs a considerable amount of heat as it passes through the neutronic field 14 in the vessel and this heated gas is then conveyed to a power converting means, such as a steam generator 16 or the like, where it is utilized in the production of power. The gases discharged from the reactor vessel 12 may be heated to a temperature which is several times greater than its initial temperature, often in excess of 1000° F. and, therefore, there is a real problem with respect to the efficient transfer of this heated gas from the reactor vessel to the apparatus for converting this heat into energy. One of the more severe problems has been in connection with providing an effectively sealed joint between the gas outlet pipe and the reactor vessel in a manner which avoids undue stresses on the vessel and pipe and excessive heat loss at the juncture of the pipe with the reactor vessel.

With the present invention, many of the problems existent heretofore in connection with the transfer of gases with respect to a power reactor vessel have been solved by placing a gas inlet pipe 18 and a gas outlet pipe 20 for the gases in the reactor system in substantially concentric relation to each other, with the inlet pipe or duct 18 forming an outer cover for the outlet duct 20 which carries the hotter gases. A series of spaced apart spiders 19 surround the inner duct 20 and provide a supporting connection between the concentric ducts. Preferably, the legs or spokes of the spiders 19 extend to the inner wall of the duct 18 but are not connected therewith, in order not to interfere with expansion of the outer duct. Further, it is preferable that the inner duct 20 carrying the hot gases be made of telescoping sections, as illustrated, in order to afford expansion and contraction of the duct. It is also desirable that a U-bend (not shown) be provided in the concentric ducts intermediate the reactor and the generator to thereby further provide means affording expansion of the ducts.

With the described concentric arrangement of the pipes, the outlet or gas discharge pipe 20 may then enter the reactor vessel 12 a substantial distance inwardly of the outer shell or wall 22 of the vessel and can be sealingly supported on an inner shell 24 in the vessel, such as that provided for the side reflector material 26. Moreover, it will also be noted that the joint provided between the discharge duct 20 and the reflector supporting shell 24 is not extremely critical, since any heat exchange at this position is carried on entirely within the reactor vessel 12. Furthermore, any stresses at the juncture of the discharge duct 20 with the inside wall portion 24 of the reactor vessel will be minimized and will not greatly affect the efficiency of the reactor, as is the case in connection with a similar joint formed between a hot gas discharge duct and the outside shell of a reactor vessel.

There is ordinarily a very small pressure differential between the incoming coolant gases and the heated gases being discharged from the reactor vessel and, consequently, with the concentric duct arrangement for effecting a transfer of these gases relative to the reactor vessel, the innermost duct may be made of relatively light gauge metal, as opposed to the heavy gauge stainless steel pipes formerly required. It will also be noted, in the described arrangement, that the cooling gases entering the reactor 12 through duct 18 provide an insulation for the heated gases being discharged therefrom through duct 20, and thereby add to the thermal efficiency of this system. In this latter respect, it is possible that under certain circumstances there may be a problem of regenerative heating of the cooling gases in the outer duct 18, but this can be eliminated or at least minimized by providing a dead gas space within the inner pipe 20. If desired, of course, other suitable means of insulating the inner pipe 20 with respect to the outer pipe 18 can be employed. However, as a practical matter, the described arrangement results in a very slight exchange of heat between the conduits, usually less than one percent of the input temperature, which is quite acceptable for the intended purpose.

A similar arrangement is also utilized with respect to the steam generator 16, with the hot gas duct 20 leading to an inner container or enclosure 28 and the cooler gas duct 18 communicating with an outer portion of the generator which is just inside the outer wall 30.

It is seen, therefore, that there is provided herein a heat transfer means which is particularly effective in connection with apparatus employing the flow of fluids at high pressures and temperatures, such as the gases circulated through a gas cooled neutronic power reactor. With the concentric duct arrangement for the exchange of gases, the thermal stresses on the exterior of the reactor vessel, as well as the steam generators into which the concentric ducts pass, are considerably reduced. Furthermore, the duct work employed and the sealing means used in connection therewith are considerably less expensive than was previously required.

Although shown and described in connection with particular apparatus, it will be apparent that various modifications of the invention might be made without departing from the principles of the invention.

We claim:

1. In a neutronic reactor system including a reactor vessel having an inner wall portion defining an inner section including the neutronic field and an outer wall portion spaced from said inner wall portion thereby defining an outer section between said outer wall portion and said inner wall portion, an improved heat transfer means comprising in combination an inlet conduit located externally of said reactor vessel and having an opened end thereof in fluid communication with said outer section and supported at the reactor vessel solely by a connection with said outer wall portion, an outlet conduit disposed within said inlet conduit in concentric relation thereto and having an open end in fluid communication with the inner section of said reactor vessel, said outlet conduit being fixedly supported at said inner wall portion and supported by means in said inlet conduit permitting expansion of said outlet conduit relative to said inlet conduit and said outer wall portion, a steam generator having an inner power producing portion and a coolant outer portion concentrically surrounding said inner portion, said generator outer portion being in fluid communication with said inlet conduit and said generator inner portion being in fluid communication with said outlet conduit, and a gaseous coolant circulating between said reactor vessel and said generator from said generator outer portion to said inlet conduit to said reactor vessel outer section and returned from said reactor vessel inner portion to said generator inner portion through said outlet conduit.

2. In the neutronic reactor system defined in claim 1, said outlet conduit comprising a plurality of interfitting telescoping sections.

References Cited in the file of this patent

UNITED STATES PATENTS

| 585,943 | Waterhouse | July 6, 1897 |
| 1,046,842 | Offutt | Dec. 10, 1912 |
| 1,993,095 | Heinrich | Mar. 5, 1935 |
| 2,396,772 | Dailey | Mar. 19, 1946 |
| 2,778,792 | Szilard | Jan. 22, 1957 |
| 2,780,596 | Anderson | Feb. 5, 1957 |
| 2,782,158 | Wheeler | Feb. 19, 1957 |
| 2,952,602 | Wootton | Sept. 13, 1960 |
| 2,975,118 | Tognoni | Mar. 14, 1961 |

FOREIGN PATENTS

| 785,528 | Great Britain | Oct. 30, 1957 |

OTHER REFERENCES

Liljeblad et al.: Proceedings of the Second United Nations Conference on the Peaceful Uses of Atomic Energy, vol. 9, September 1958, pages 136, 145, and 146.

The Reactor Handbook (AECD-3646), vol. 2, September 1955, page 118.

Briggs et al.: Proceedings of the International Conference on the Peaceful Uses of Atomic Energy, vol. 3, August 1955, page 180.